United States Patent [19]
Blair

[11] Patent Number: 5,783,872
[45] Date of Patent: Jul. 21, 1998

[54] AUXILIARY BATTERY VOLTAGE/ TEMPERATURE COMPENSATION FOR AUTOMOTIVE 12 VOLT SYSTEM FOR ELECTRIC VEHICLES

[75] Inventor: James W. Blair, Catonsville, Md.

[73] Assignee: Northrop Grumman Corporation, Los Angeles, Calif.

[21] Appl. No.: 685,886

[22] Filed: Jul. 25, 1996

[51] Int. Cl.[6] .................................................. H02J 1/12
[52] U.S. Cl. .............................. 307/46; 320/35; 320/19; 323/369
[58] Field of Search ..................... 320/35, 19; 307/46, 307/48, 66, 10.7; 363/132, 17, 99, 123; 323/369

[56] References Cited

U.S. PATENT DOCUMENTS 5,162,720  11/1992  Lambert ................................. 320/6
5,204,610  4/1993  Pierson et al. ....................... 320/15
5,488,283  1/1996  Dougherty et al. .................. 320/15

Primary Examiner—Peter S. Wong
Assistant Examiner—Shawn Riley
Attorney, Agent, or Firm—Walter G. Sutcliff

[57] ABSTRACT

A battery temperature compensation circuit for a DC/DC converter which is used to charge an auxiliary battery for an electric vehicle and including, among other things, a voltage sensitive resistance, such as a thermistor, coupled to a clamped voltage divider network which generates a resistance vs. temperature characteristic so as to control the DC/DC converter and provide an output voltage for charging the auxiliary battery which matches the voltage vs. temperature profile of the battery.

18 Claims, 4 Drawing Sheets

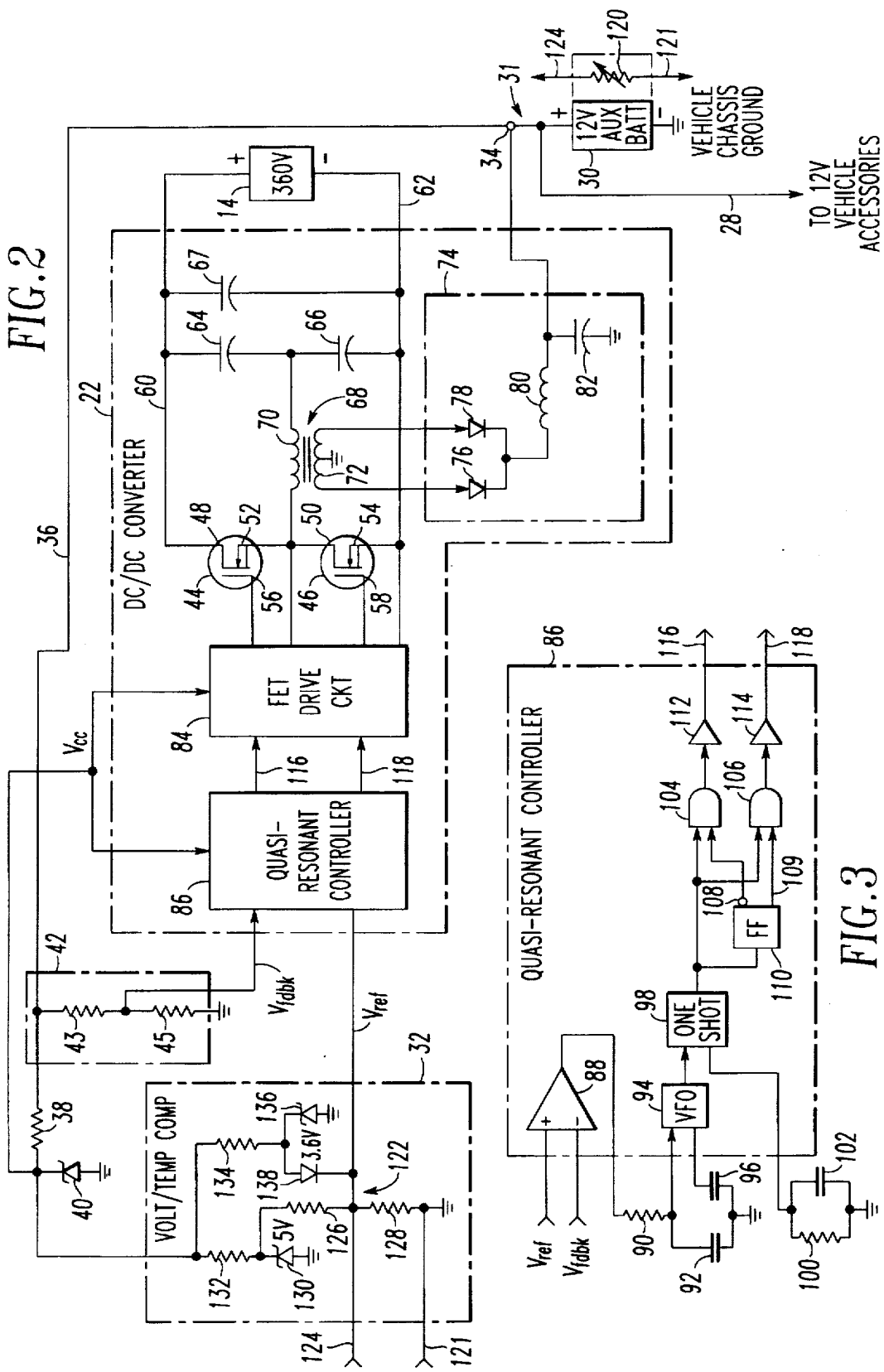

AUXILIARY BATTERY VOLTAGE/ TEMPERATURE COMPENSATION FOR AUTOMOTIVE 12 VOLT SYSTEM FOR ELECTRIC VEHICLES

CROSS REFERENCE TO RELATED APPLICATIONS

This application is related to the following U.S. patent applications which are intended to be incorporated herein by reference:

U.S. patent application Ser. No. 08/258,301 (WE58,335) entitled, "Electric Vehicle Propulsion System", filed on Jun. 10, 1994;

U.S. patent application Ser. No. 08/258,294, (WE58,336) entitled, "Speed Control and Boot Strap Technique For High Voltage Motor Control", filed on Jun. 10, 1994, now abandoned;

U.S. patent application Ser. No. 08/258,306, (WE58,337) entitled, "Vector Control Board For An Electric Vehicle Propulsion System Motor Controller", filed on Jun. 10, 1994, now U.S. Pat. No. 5,627,758;

U.S. patent application Ser. No. 08/258,149, (WE58,339) entitled, "Control Mechanism For Electric Vehicle", filed on Jun. 10, 1994, now U.S. Pat. No. 5,463,294;

U.S. patent application Ser. No. 08/258,157, (WE58,346) entitled, "Electric Vehicle Power Distribution Module", filed on Jun. 10, 1994, now U.S. Pat. No. 5,504,655;

U.S. patent application Ser. No. 08/258,628, (WE58,347) entitled, "Electric Vehicle Chassis Controller", filed on Jun. 10, 1994, now U.S. Pat. No. 5,508,594;

U.S. patent application Ser. No. 08/258,154, (WE58,352) entitled, "Electric Vehicle Battery Charger", filed on Jun. 10, 1994, now U.S. Pat. No. 5,581,171; and U.S. patent application Ser. No. 08/258,142, (WE58,333) entitled, "Automotive 12 volt System For Electric Vehicles", filed on Jun. 10, 1996, now abandoned.

BACKGROUND OF THE INVENTION

This invention relates generally to electric vehicles and more particularly to the 12 volt electrical power system for electric vehicles and an auxiliary battery therefor.

DISCUSSION OF THE RELATED ART

Vehicles powered by internal combustion engines have long supplied an important share of the world's transportation needs. However, it is inevitable that petroleum reserves which supply fuel for internal combustion engines will sooner or later decline to a point where the cost of the fuel for internal combustion vehicles becomes prohibitive. Another factor clouding the future of internal combustion vehicles is that ever more stringent regulations of exhaust emissions from such vehicles. These and other factors have lead to an increasing effort to develop a commercially acceptable alternative to the internal combustion engine for powering a motor vehicle and more particularly to an electric propulsion system for such vehicles.

For an electric motor vehicle to be commercially viable, its cost and performance must be competitive with that of its internal combustion engine counterpart. Moreover, an electric vehicle must be reasonably compatible with existing vehicles powered by internal combustion engines so that potential customers will encounter a comfortable and familiar environment.

State of the art motor vehicles include a vast array of accessories that operate from a 12 volt power source. These accessories include radios, CD players, headlights, clocks, fan motors, windshield wipers, telephones, and 2-way communications radios, to name a few. An electric vehicle must therefore include a 12 volt system for operating such accessories. This 12 volt system must be provided in addition to a high voltage (200–600 volt) DC system from which the electric vehicle propulsion system typically operates.

In order to satisfy the requirements of a 12 volt electrical system for an electric vehicle, the above referenced related application Ser. No. 08/258,142, (WE58,333) entitled, "Automotive 12 volt system for electric vehicles", now abandoned, discloses a system including a DC/DC converter powered from a high voltage (320V) DC battery and which provides a single 12 volt regulated output for powering the 12 volt accessories. However, the 12 volt DC/DC converter will not operate without the presence of the high voltage input from the vehicle battery pack. In an emergency power outage situation the entire system is without electrical power. Therefore, another energy source, such as an auxiliary 12 volt battery, must be present in order to power-up apparatus for sending distress signals and/or utilities, e.g. emergency flashers, under-hood lamps, CB radios, cellular telephones, etc.

Therefore, along with the need for an auxiliary battery, comes the need to regulate the output of the DC/DC converter so as not to overcharge the auxiliary battery from the DC/DC output. Because of the voltage at the terminals of the auxiliary battery will vary as a function of the battery temperature, not only does the converter's output have to match the battery voltage but it must also track the battery's voltage with respect to the battery's temperature.

SUMMARY

Accordingly, it is an object of the present invention to provide an auxiliary electrical power system for an electric motor vehicle.

It is another object of the invention to provide an auxiliary 12 volt battery in addition to the high voltage battery used to power the propulsion system in an electric motor vehicle.

It is yet another object of the invention to provide an auxiliary 12 volt battery in an electric vehicle's 12 volt system which is charged by a DC/DC converter powered by the vehicle's high voltage source which powers the propulsion system.

It is a further object of the invention to provide an auxiliary 12 volt battery in an electric motor vehicle's 12 volt system which includes a voltage/temperature compensation circuit for the auxiliary battery.

And it is still yet another object of the invention to provide an auxiliary 12 volt battery for an electric vehicle's 12 volt system which is charged by a regulated DC/DC converter so that the auxiliary battery whose output voltage varies as a function of temperature is not over charged.

These and other objects are fulfilled by a power system for an electric motor vehicle and accessories thereof, comprising a first DC power source generating a relatively high DC voltage for powering a vehicle propulsion motor, a second DC power source comprising a DC to DC converter powered by the first power source and generating a relatively low DC voltage for powering the low voltage accessories of the motor vehicle, an auxiliary DC power source for powering the accessories upon failure of said first DC power source and consequently the DC to DC converter, and means for regulating the output voltage of the DC to DC converter in response to a first signal corresponding to the output voltage of the converter and in response to a second signal corresponding to the output voltage of the auxiliary DC power source.

These and other objects are further fulfilled by a battery voltage/temperature compensation circuit for a DC/DC converter which is used to charge an auxiliary battery for an electric vehicle and including, among other things, a voltage sensitive resistance, such as a thermistor coupled to a clamped voltage divider network which generates a resistance vs. temperature characteristic so as to control the DC/DC converter and provide an output voltage for charging the auxiliary battery which matches the voltage vs. temperature profile of the battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an electrical schematic diagram of the preferred embodiment of the invention;

FIG. 3 is an electrical block diagram illustrative of the quasi-resonant controller shown in FIG. 2;

DETAILED DESCRIPTION OF THE INVENTION

Figure 1:
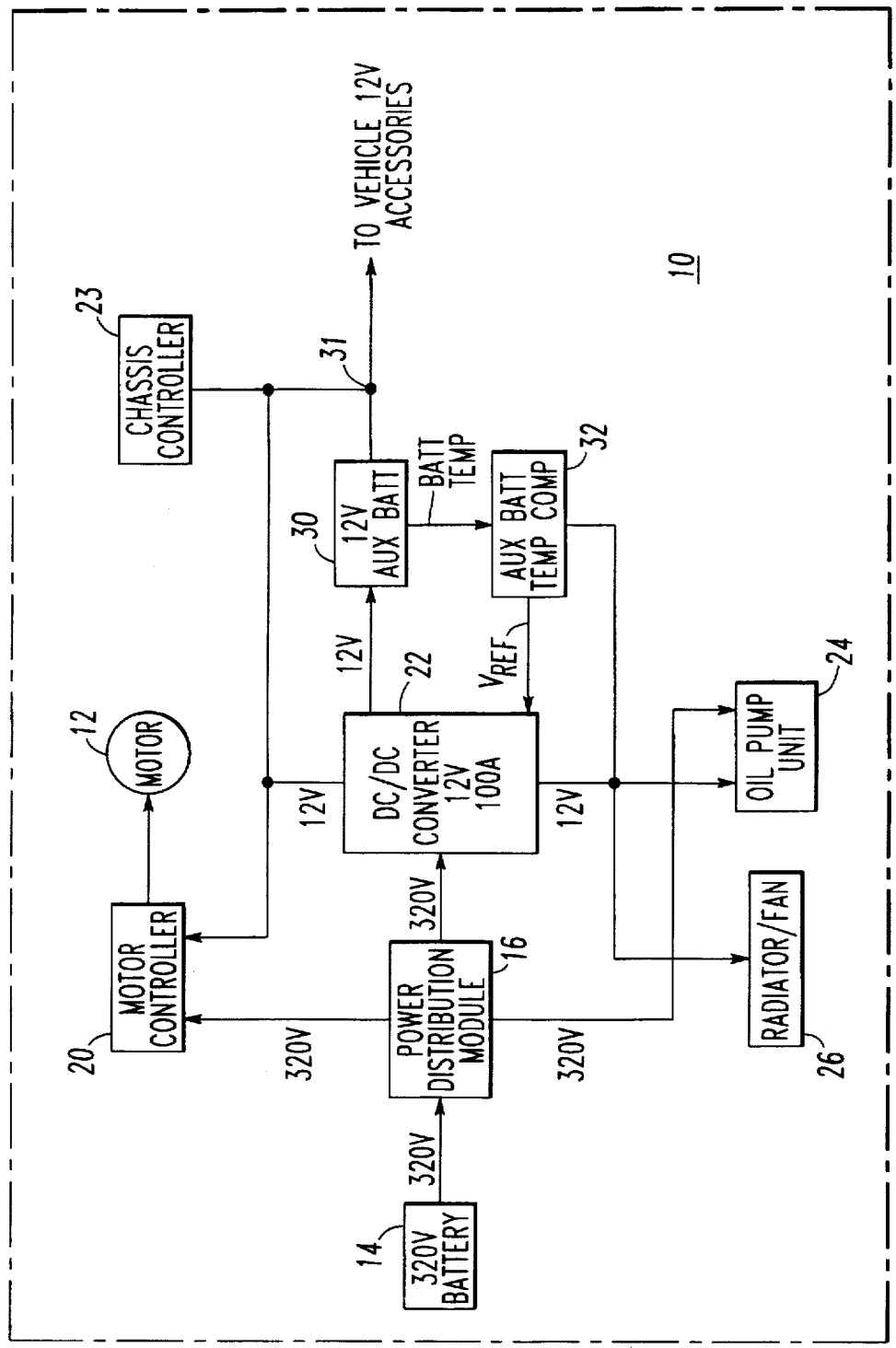
FIG. 1 is an electrical block diagram illustrative of an electric motor vehicle propulsion system in accordance with the subject invention.

Referring now to the drawings and more particularly to FIG. 1, shown thereat is an electrically powered motor vehicle 10 such as shown and described in the above referenced related patent application Ser. No. 08/258,301, (WE58,335) and whose form of propulsion is by way of a DC motor 12 powered by a 320 volt high voltage DC battery 14 through a power distribution module 16 and a motor controller 20. The battery 14 comprises the primary source of power for the electric vehicle 10 and comprises, for example, a sealed lead acid battery, a monopolar lithium metal sulfide battery, a bipolar lithium metal sulfide battery, or the like, for providing a 320 volt output. The motor 10 operates over a wide voltage range, such as 120 volts to 400 volts, to accommodate changes in the output voltage of the battery 14 due to load or depth of discharge.

The power distribution module 16 is coupled to the output of the 320 volt battery 14 and includes, among other things, fuses, wiring, and connectors for distributing the 320 volt DC output from the battery 14 to various components of the electric vehicle 10. The power distribution module 16 not only distributes the 320 volt output from the battery to the motor controller 20, but also to a DC/DC converter 22, an oil pump unit 24, a radiator/fan assembly 26. The details of the power distribution module 16 are furthermore disclosed in the above-referenced related patent application Ser. No. 08/258,157, (WE58,346).

The DC/DC converter 22 is coupled to the 320 volt output of the battery 14 via the power distribution module 16, and converts the 320 volt output therefrom to 12 volts DC. The DC/DC converter 22 comprises the primary source of 12 volt DC power, replacing the conventional alternator, and supplies its 12 volt output as the normal operating power to the motor controller 20, the chassis controller 23, the oil pump unit 24, the radiator/fan assembly 26, and various 12 volt vehicle accessories, not shown.

The converter 22 also acts as a recharging source for a 12 volt DC auxiliary battery 30 which is intended to act only as a start-up source of power for the DC to DC converter 22, but in an emergency power outage situation of the 320 volt battery 14 and consequently the converter 22 to power the 12 volt accessories, particularly those accessories used for generating and sending distress signals and/or utilities such as emergency flashers, under hood lamps, CB radios, cellular phones, etc. Thus the auxiliary battery 30 exists as a back-up 12 volt DC source in the event that the DC/DC converter 22 fails upon loss of 320 volts from the high voltage battery 14.

Because the voltage across the battery terminals of the auxiliary battery 30 will vary as a function of the battery temperature, the present invention includes a circuit 32 for tracking the battery voltage with respect to temperature and provide a control parameter for regulating the output of the DC/DC converter 22 to match the output appearing at the (+) and (−) output terminals of the auxiliary battery 30 so as not to over charge the battery.

Referring now to FIG. 2, shown thereat, among other things, is an electrical schematic diagram of the DC/DC converter 22. The converter 22 is connected not only to the battery 14 which supplies 320 volts thereto, and also outputs a 12 volt supply voltage at terminal 34 which is directly connected to the positive (+) terminal of the auxiliary battery 30 for supplying a charge potential thereto. The 12 volt vehicle accessories, not shown, are powered by either the converter 22 or the auxiliary battery 30 by means of a power cable 28 directly connected both to the converter's output terminal 34 and the positive (+) terminal of the auxiliary battery 30 at circuit node 31. As shown a power lead 36 is also coupled to circuit node 31 to provide a 12 volt DC supply voltage to the converter 22 and the voltage/temperature compensation circuit 32 by way of a resistor 38 and zener diode 40 and also to provide a feedback signal by way of a resistive type voltage divider 42 to the converter 22.

The converter 22, by being coupled to power lead 36 as shown, receives a start-up power voltage $V_{cc}$ from the auxiliary battery 30. In addition to the feedback signal $V_{fdbk}$ comprising a sample of the converter's output voltage appearing at output terminal 34, the DC to DC converter 22 also receives a temperature reference signal $V_{ref}$ from the compensation circuit 32.

As further shown in FIG. 2, the DC/DC converter 22 includes a pair of electronic switch devices 44 and 46 which comprise type IXFN36N60 high voltage switching field effect transistors (FET) manufactured by the IXYS Corporation of San Jose, Calif. The FETs 44 and 46 include a first switching terminal 48 and 50, respectively, and a second switching terminal 52 and 54 as well as a respective control terminal 56 and 58. The terminal 48 is connected to a first input power conductor 60, while conductor 54 is connected to a second input power conductor 62. The converter 22 additionally includes a pair of capacitors 64 and 66 connected in series across the input conductors 60 and 62 and which is shunted by a third capacitor 67.

The converter 22 further includes an output transformer 68 having a primary winding 70 and a secondary winding 72. The primary winding 70 is connected between the junction of capacitors 64 and 66 and the junction of switching terminals 50 and 52. The secondary winding 72 is connected to an output rectifier circuit 74 including a pair of rectifier diodes 76 and 78 having respective anodes connected to opposite ends of the secondary winding 72, while the cathodes are commonly connected together to one side of an inductor 80 forming a filter circuit in combination with capacitor 82 shown connected to ground. The rectifier circuit 74 provides a 12 volt DC output and a maximum current typically of 100 amp.

The DC/DC converter 22 functions as an inverter circuit in which the switching devices 44 and 46 are alternately switched on and off to conduct current from the 360 volt battery 14 by way of the conductors 60 and 62 through the primary winding 70 of the transformer 68. This action induces current through the secondary winding 72 which is rectified by the diodes 76 and 78 and filtered by the inductor 80 and the capacitor 82 to provide a regulated 12 volt DC output at terminal 34.

The on-off control of the FET switches 44 and 46 is provided by a conventional FET drive circuit 84. The drive circuit 84 is controlled by a quasi-resonant controller circuit 86 which is further shown in FIG. 3. The drive circuit typically comprises a type TC4424EOA dual gate drive circuit manufactured by the Teledyne Semiconductor Corporation of Mountainview, Calif.

Referring now to FIG. 3, the controller 86 is shown comprised of an error amplifier 88 whose differential output is connected through an RC network consisting of a resistor 90 and capacitor 92 to the input of a variable frequency oscillator (VFO) 94 which additionally includes another frequency determining capacitor 96 coupled thereto. The output of the VFO 94 is coupled to a one-shot multivibrator 98 whose output pulsewidth is determined by the parallel combination of resistor 100 and capacitor 102. The output of the one shot multivibrator 98 is commonly fed to one input of a pair of AND gates 104 and 106 whose other inputs are coupled to the inverted and non-inverted outputs 108 and 109 of the flip-flop circuit 110. The output of the AND gates 104 and 106 are fed to a pair of inverter type output op-amp 112 and 114, which provide a pair of output pulses having circuit controlled parameters which are fed to the FET drive circuit 84 through circuit leads 116 and 118. Such a circuit is typically embodied in a type UC2860DW resonant inverter control chip commercially available from Unitrode Integrated Circuits Corporation of Merrimack, N.H.

As further shown in FIG. 2, the temperature variable resistor or thermistor 120 which is thermally coupled to the auxiliary battery 30, is electrically coupled to voltage/temperature compensation circuit 32. One end of the thermistor 120 is grounded via a circuit lead 121 while the other end is connected to circuit node 122 by means of a circuit lead 124. The signal at circuit node 122 comprises a reference signal $V_{ref}$ corresponding to the temperature of the battery 30 which is then applied to DC to DC converter 22 along with the feedback signal $V_{fdbk}$.

In addition to the thermistor 120 being connected to circuit node 122, there are two other circuits connected thereto. The first comprises a voltage divider network including a pair of fixed resistors 126 and 128 connected to a precision 5 volt zener diode 130 connected to zener diode 40 by a series resistor 132. The lower resistor 128, moreover, shunts the thermistor 120 via the circuit leads 121 and 124. The second circuit includes a fixed resistor 134 connected to zener diode 40. A 3.6 volt zener diode 136 is connected from the resistor 134 to ground while a semiconductor blocking diode 138 is connected from the resistor 134 to circuit node 122.

In operation, when a 12 volt supply voltage $V_{cc}$ is applied to the converter 22, the quasi-resonant controller circuit 86 generates variable frequency output pulses which appear on circuit leads 116 and 118 which are fed to the FET drive circuit 84. These output pulses are supplied to the FETs 44 and 46 via circuit leads 56 and 58, which causes the FETs 44 and 46 to alternately switch between opposite conductive states as specified by the pulse generated by the controller circuit 86, meaning that when FET 44 is rendered conductive, FET 46 is rendered non-conductive, and vice versa.

In an initial condition before operation of the FETs 44 and 46 begin, capacitors 64 and 66 form a voltage divider across the conductors 60 and 62. Thus, one half of the battery voltage of the high voltage DC battery 14 appears across each of the capacitors 64 and 66. When FET 44 is first rendered conductive, half of the current through FET 44 travels from the battery 14 to charge the capacitor 66 and half comes from the discharging of capacitor 64. FET 44 is then rendered non-conductive and FET 46 is rendered conductive. In this state, a portion of the current through FET 46 comes from the discharge of the capacitor 66 and the remainder comes from the battery 14 charging capacitor 64.

Switching of the FETs 44 and 46 causes current flow in alternating directions through the primary winding 70. This in turn induces current in the secondary winding 72, which is rectified by the diodes 76 and 78 and filtered by the inductor 80 and the capacitor 82 to provide 12 volt DC power at the output terminal 36.

At light loads, that is when the current drawn from the output terminal 36 is low, capacitors 64 and 66 continue to act as a voltage divider. Thus the voltage across the primary winding 70 is approximately one half of the battery voltage across the battery 14. As additional current is drawn from the output terminal 36, the voltage at terminal 36 tends to decrease. This decrease in voltage is sensed by the voltage divider 38 consisting of resistors 35 and 37, providing the feedback voltage $V_{fdbk}$ to the controller 86. In response to the decrease in the value of the feedback voltage $V_{fdbk}$, the control circuit increases the frequency of the pulses delivered through the drive circuit 84 to the FETs 44 and 46.

Figure 4:
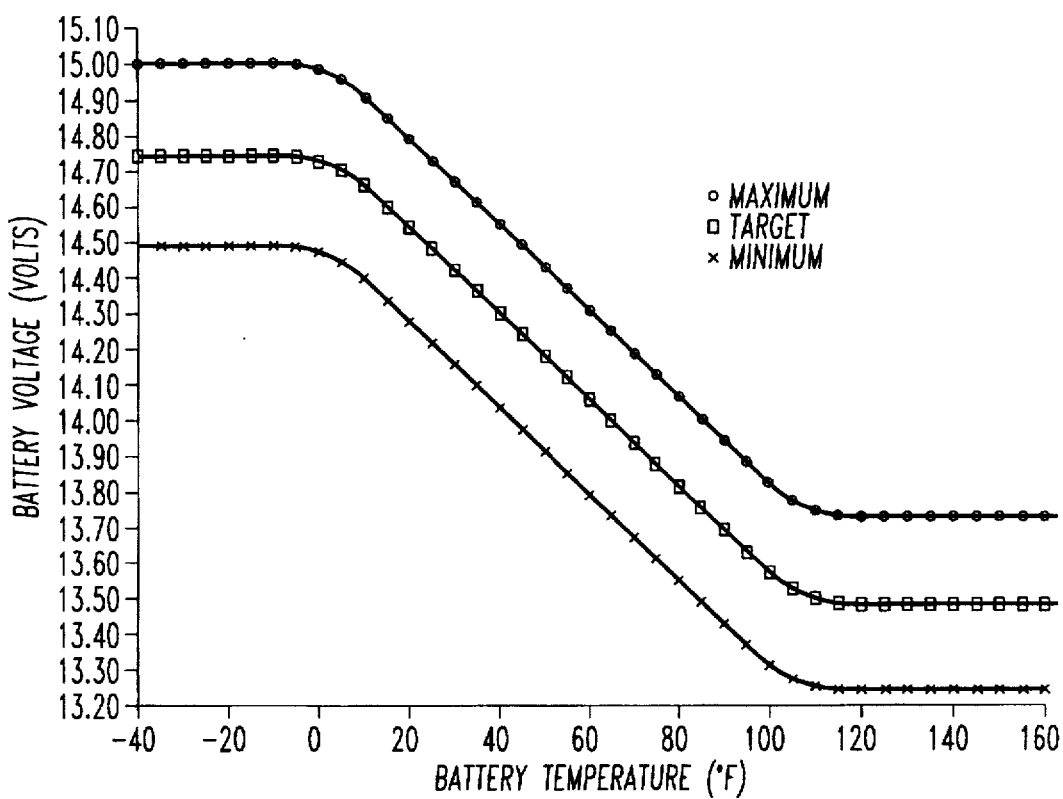
FIG. 4 is a set of characteristic curves depicting the battery output voltage of the auxiliary battery shown in FIG. 2 as a function of temperature.
Figure 5:
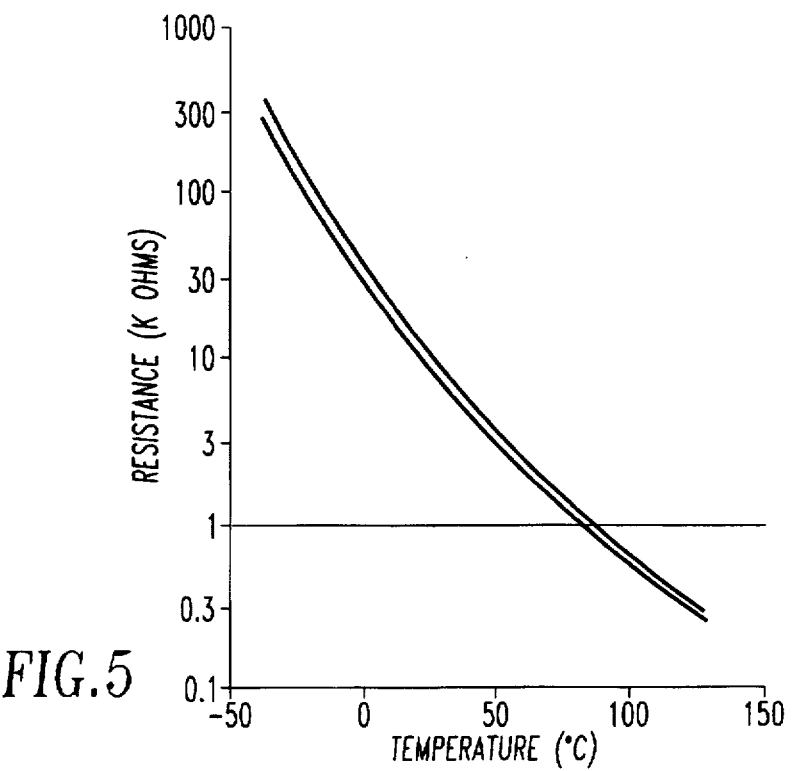
FIG. 5 is a set of characteristic curves illustrative of resistance change of a thermistor used in the circuit shown in FIG. 2 as a function of temperature for a thermistor.

Inasmuch as the DC/DC converter 22 is also used to charge the auxiliary battery 30, the frequency output of the resonant controller 86 is now made to track the temperature vs. output voltage characteristic of the auxiliary battery 30 as shown in FIG. 4 by way of the thermistor 120 whose resistance voltage characteristic is shown in FIG. 5. The voltage/temperature compensation circuit 32 accordingly generates a temperature reference voltage $V_{ref}$ for the controller 86.

As shown in FIG. 3, the feedback voltage $V_{fdbk}$ is fed to the inverting (−) input of the error amplifier 88 (FIG. 3), while the reference voltage $V_{ref}$ is applied to the non-inverting(+) input. A regulation point for the DC/DC converter 22 is reached at the point where the two input voltages to the error amplifier 88 are equal to each other and comprises the amplifier's threshold. The amplifier's threshold, accordingly, is varied as a function of battery temperature by the resistance voltage divider combination of resistors 126 and 128, with the top resistor 126 being tied to the 5 volt precision reference which is provided by the zener diode 130, the bottom resistor 128 being coupled in parallel with the thermistor 120, and the common point therebetween, i.e. circuit node 122 being connected to the non-inverting(+) input of the error amplifier 88.

The circuit operates in such a way that when the resistance of the thermistor 120 goes up for a decrease in battery temperature according to the characteristics shown in FIG. 5, the threshold voltage at circuit node 122 and, accordingly, the reference voltage $V_{ref}$ applied to the resonant controller 86 goes up as well, causes the DC/DC converter 22 to regulate at a higher point and increase the frequency of the VFO 94. Inversely, as the resistance of the thermistor 120 goes down indicative of a temperature increase, so does the threshold or reference voltage $V_{ref}$ and thus VFO frequency decreases. With proper selection of resistor values for resistors 126 and 128 in relation to the thermistor 120, the threshold is set accordingly to obtain a desired regulated output voltage at terminal 36 of the converter 22.

A problem arises, however, when the battery temperature falls below −10° F. and rises above 110° F. due to flattening of the temperature vs. battery voltage curves shown in FIG. 4. This is overcome by clamping the $V_{ref}$ voltage at circuit node 122, which is connected to the non-inverting(+) input of the error amplifier 88.

At the cold end, the solution is relatively simple. The resistor divider circuit including resistors 126 and 128 are selected so that for resistances greater than 30K ohm, a maximum reference voltage $V_{ref}$ is clamped at approximately 14.5V DC as shown in FIG. 4 so that it cannot rise any higher than 15.0 volts. At the opposite extreme where hot temperatures are encountered, the reference voltage $V_{ref}$ is clamped so as not to go below a value corresponding to 13 volts DC, as shown in FIG. 4. This is accomplished by using a second voltage clamp consisting of zener diode 136 providing a clamped voltage value such as 3.6 volts and connecting it to the circuit node 122 via the blocking diode 138 that will not conduct until the signal applied to the non-inverting(+) input, i.e. $V_{ref}$, is below a specified point, i.e. the difference between the voltage drop by the zener diode 36, such as 3.6 volts, and the diode voltage drop.

When these points are properly set, the hot temperature/ low voltage clamp requirement will be implemented and the variable frequency output from the controller 86 will be changed accordingly so that the converter 22 will be regulated in accordance with the thermal profile of the auxiliary battery 30 so that the converter 22 will not overcharge the auxiliary battery 30 which is connected to and charged by the output of the DC/DC converter 22.

Figure 6:
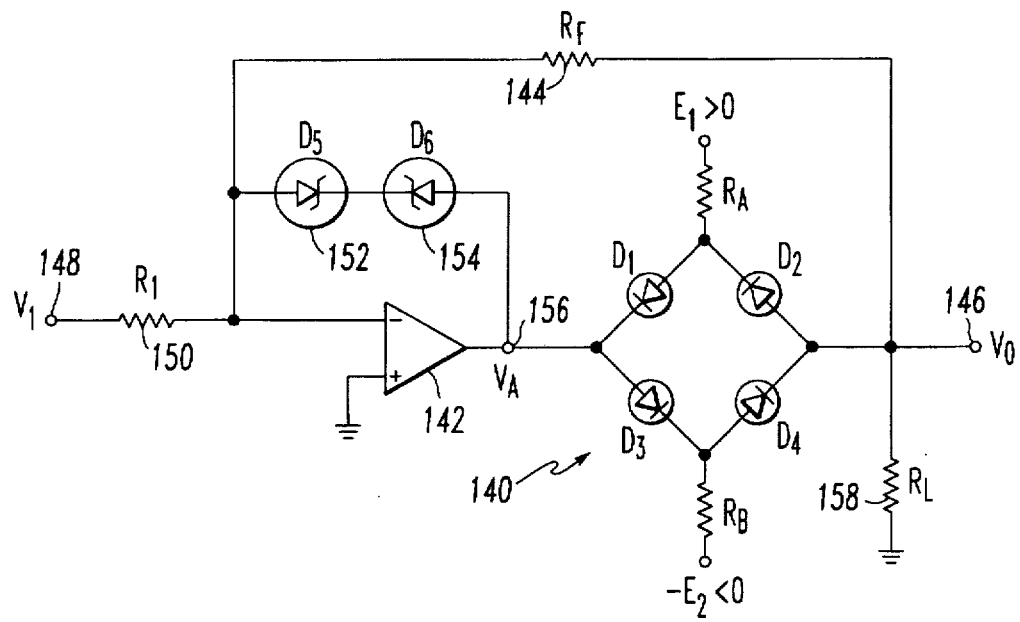
FIG. 6 is a schematic diagram illustrative of a second embodiment of the subject invention.

An alternative arrangement for achieving temperature compensation is shown in FIG. 6 and involves the use of a precision bridge limiter comprised of a 4-diode bridge 140 embedded in a feedback loop including an operational amplifier 142 and a feedback resistor 144 coupled from the output terminal 146 providing an output voltage $V_o$ and the inverting(−) input of the amplifier 142. The inverting(−) input is additionally coupled to an input terminal 148 via resistor 150. Also, a pair of zener diodes 152 and 154 are coupled in mutual opposition between the amplifier output terminal 156 and its inverting(−) input terminal. The zener diodes 152 and 154 merely serve to prevent amplifier overload. A load resistor 158 is shown connected between output terminal 146 and ground.

Figure 7:
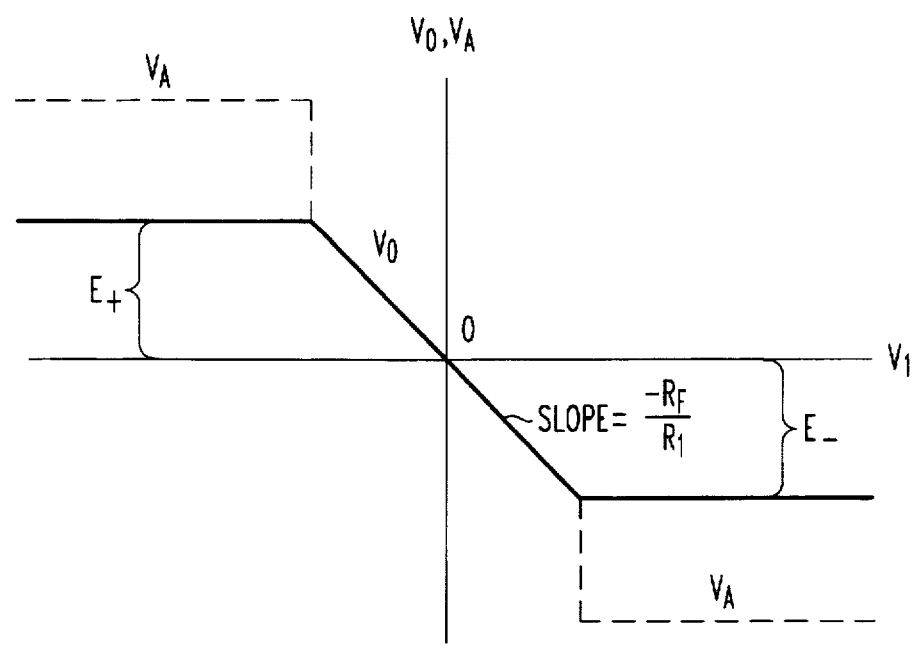
FIG. 7 is a graph illustrative of the output voltage characteristic of the circuit shown in FIG. 6 as a function of the input voltage.

The nominal transfer function of the circuit shown in FIG. 6 is that shown in FIG. 7 and corresponds to the temperature vs. voltage characteristic of the battery as shown in FIG. 4. Although not shown, the circuitry shown in FIG. 6 requires an offset circuit to center the transfer characteristic to the operating range of the converter 22 shown in FIG. 2 and therefore would add some complexity to the circuitry in its implementation, thus making the embodiment shown in FIG. 2 the more desirable embodiment.

Thus what has been shown is a 12 volt DC system for an electric motor vehicle that includes an auxiliary battery which is charged through a DC/DC converter which replaces the conventional alternator for generating a supply voltage for vehicle accessories and one whose converter is additionally regulated to track the auxiliary battery's output voltage with respect to temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims.

I claim:

1. A power system for an electric motor vehicle and accessories thereof, comprising:

a first DC power source generating a relatively high DC voltage for powering a vehicle propulsion motor;

a second DC power source comprising a DC to DC converter powered by said first power source and generating a relatively low DC voltage for powering certain accessories of said accessories of said motor vehicle;

an auxiliary DC power source comprising a battery having an output voltage which varies as a function of temperature for powering said accessories upon failure of said first DC power source and consequently said DC to DC converter, said battery further being coupled to said DC to DC converter and including means for being charged thereby; and means for regulating the output voltage of said DC to DC converter in response to a feedback signal corresponding to the output voltage of said converter and in response to a temperature reference signal corresponding to the output voltage of said battery so that the DC to DC converter will charge the battery with a voltage which matches a voltage vs. temperature profile of the battery and thus preventing the battery from being overcharged.

2. A power system in accordance with claim 1 wherein first DC power source comprises a relatively high voltage DC battery.

3. A power system in accordance with claim 1 wherein said means for regulating the output of said converter includes a control circuit responsive to said feedback voltage and said temperature reference voltage for controlling the alternate conductivity of a pair of switching devices coupled to said first DC power source for generating a variable frequency AC power signal applied to a rectifier circuit for providing said output voltage.

4. A power system in accordance with claim 3 and additionally including first circuit means for generating said feedback voltage and second circuit means for generating said temperature reference voltage.

5. A power system in accordance with claim 4 wherein said second circuit means includes a circuit element thermally coupled to said auxiliary battery and having an electrical characteristic which varies as a function of temperature.

6. A power system in accordance with claim 5 and wherein said circuit element comprises a thermistor.

7. A power system in accordance with claim 1 and additionally including first circuit means coupled to a first circuit node including an output terminal of said converter for generating said feedback voltage.

8. A power system in accordance with claim 7 wherein said first circuit means comprises a voltage divider comprised of a pair of series connected resistor elements and said feedback voltage comprises a voltage appearing across one of said resistor elements.

9. A power system in accordance with claim 7 and additionally including second circuit means coupled to said first circuit node, said first circuit node additionally including a direct connection of a battery terminal of said auxiliary battery for generating said temperature reference voltage.

10. A power system in accordance with claim 9 wherein said second circuit means includes a circuit element thermally coupled to said auxiliary battery and having an electrical characteristic which varies as a function of temperature.

11. A power system in accordance with claim 10 wherein said circuit element comprises a resistance type element.

12. A power system in accordance with claim 10 wherein said circuit element comprises a thermistor.

13. A power system in accordance with claim 12 and wherein said second circuit means includes a second circuit node common to said thermistor and said input of said converter, and first and second voltage clamp circuits coupled between first circuit node and said second circuit node for limiting the upper and lower voltage levels of said reference voltage so as to correspond to a temperature versus output voltage characteristic of said auxiliary battery.

14. A power system in accordance with claim 13 and wherein said first voltage clamp clamps at a higher voltage level than said second voltage clamp, and additionally including a voltage divider including first and second series connected resistors coupled to said first voltage clamp and having one of said resistors connected in parallel with said thermistor, said second circuit node being at one end thereof and common to said input of said converter, and a blocking diode connecting said second voltage clamp to said second circuit node.

15. A power system in accordance with claim 13 wherein said means for regulating the output voltage of said converter includes a control circuit responsive to both said feedback voltage and said temperature reference voltage for generating a variable frequency control signal for varying the magnitude of the output voltage of said converter.

16. A power system in accordance with claim 15 wherein said control circuit includes a variable frequency oscillator whose frequency varies as a function of the difference between said reference voltage and said feedback voltage.

17. A method of powering an electric vehicle and accessories thereof, comprising the steps of:

(a) powering a vehicle propulsion motor by a relatively high voltage DC power source;

(b) powering certain vehicle accessories by a relatively low voltage DC to DC converter, said DC to DC converter being powered by said relatively high voltage DC power source;

(c) powering said accessories by an auxiliary DC battery having an output voltage which varies with temperature when said relatively high voltage DC power source and consequently said DC to DC converter are inoperative;

(d) charging the auxiliary DC battery by the DC to DC converter; and (e) regulating the output voltage of said DC to DC converter in response to a feedback signal having a value which is a function of the value of said output voltage of said DC to DC converter and in response to a temperature reference signal which is a function of the value of the output voltage of said auxiliary DC battery so that the DC to DC converter will charge the battery with a voltage which matches a voltage vs. temperature profile of the battery so as not to overcharge the battery.

18. A method according to claim 17 wherein said relatively high voltage DC power source comprises a battery.

* * * * *